United States Patent Office 3,407,872
Patented Oct. 29, 1968

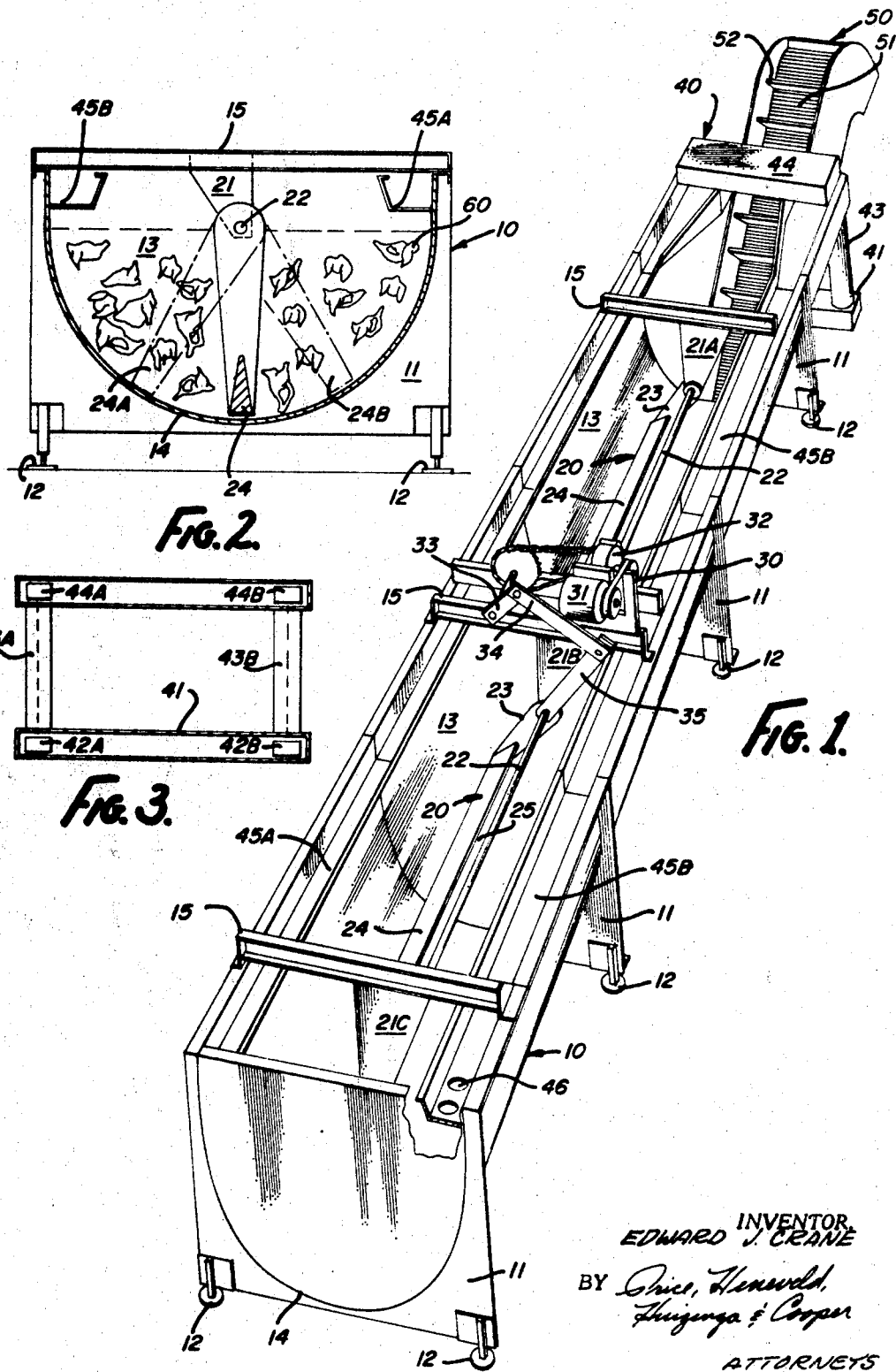

3,407,872
HEAT EXCHANGE TANK
Edward J. Crane, Ottumwa, Iowa, assignor to International Agri-Systems, Inc., a corporation of Iowa
Filed Mar. 30, 1967, Ser. No. 627,123
7 Claims. (Cl. 165—109)

ABSTRACT OF THE DISCLOSURE

The device which is the subject of this disclosure has an elongated chilling or de-chilling tank, means for circulating heat exchange fluid through the tank from one extremity thereof to the other and an elongated paddle positioned within the tank, preferably near the bottom hereof. An elongated shaft rotatably carries the paddle on a series of paddle supporting arms and means are provided for oscillating the shaft and, thus, the paddle to accelerate the chilling or de-chilling process. It is understood that this abstract is not to be utilized to limit the scope of the claimed invention.

BACKGROUND

This invention relates to heat-exchange tanks and, more particularly, to chilling or de-chilling tanks particularly adaptable for utilization in the chilling and/or de-chilling of edible products such as poultry. It is customary in the art to utilize an elongated tank having a heat-exchange liquid, usually water, circulated therein. Generally, the poultry or other types of edibles are introduced at one end of the tank and migrate over a period of time to the opposite end of the tank where they are lifted from the heat-exchange liquid by means of a conveyor or the like.

It has been discovered that the chilling process can be accelerated considerably if the particular edibles are agitated during the period in which they are in the tank. A number of schemes have been proposed for performing this agitation and, to some extent, they have represented a marked improvement over the prior art practice of merely allowing the edibles to soak in the tank for periods sometimes exceeding twenty-four hours. Currently available agitation apparatus, however, suffers from a distinct tendency to bruise the edibles, particularly in the case of poultry and, thus, render them non-acceptable for Grade A marketing. Also of pertinence is the fact that even with such agitation systems a great percentage of the assembly-line production time of the particular edible is spent in the cooling tanks and, thus, any further reduction in this time span markedly improves the efficiency of the over-all operation.

OBJECTS AND SPECIFICATION

It is an object of this invention to provide a heat-exchange tank embodying a product agitation apparatus which markedly decreases the time that a particular product must remain in the heat-exchange tank to bring its temperature down or up to the desired point.

More particularly, it is an object of this invention to provide an apparatus of the type described which agitates the edible products within the tank in such a manner that the heat-exchange liquid will be constantly circulated adjacent the surfaces thereof and, thus, wherein the heat-exchange liquid temperature may be kept relatively uniform throughout the tank, pockets of warmer or colder fluid not being allowed to collect adjacent and within the products being chilled.

It is yet another object of this invention to provide a device of the type described wherein agitation of the edible product is accomplished without bruising or tearing it and, thus, wherein the percentage of Grade A marketable products passing through the assembly-line production unit will be markedly increased.

These as well as other objects of this invention will be readily apparent to those skilled in the art by reference to the following specification and accompanying figures in which:

FIG. 1 is a perspective view of the heat-exchange tank embodying the novel agitation apparatus which is the subject of this invention;

FIG. 2 is a cross-sectional view of the tank; and

FIG. 3 is a schematic, cross-sectional view of the heat-exchange liquid circulating device.

Briefly, the heat exchange apparatus which is the subject of this invention comprises an elongated tank having means associated therewith for circulating a heat-exchange fluid therethrough. Positioned in the tank is an elongated paddle and means are provided for oscillating the paddle back and forth within the tank. Preferably, the path of oscillation is such that the lower edge of the paddle traces a path conforming generally to the cross-sectional contour of the lower section of the tank.

Referring now to the figures, a preferred embodiment of this invention will be described in detail. For purposes of explanation, it will be assumed that the heat-exchange apparatus is being utilized on a poultry-dressing production line and that the birds are introduced thereinto for the purposes of chilling them. This environmental assumption, however, is not to limit the scope of the invention. For example, a tank embodying the novel agitation apparatus to be described could be used just as effectively to thaw frozen poultry to bring their temperatures up to a predetermined minimum. Also, of course, the apparatus might well be utilized in the similar processing of other types of edible products.

Referring initially to FIGS. 1 and 2, the tank assembly 10 comprises a plurality of vertical frame members 11, each having a pair of conventional levelers 12 affixed thereto for floor contact. Slung between the vertical frame members 11 is an elongated tank 13 which, preferably, has a circular contour at its lower cross section. Suitable horizontal braces 15 may be provided to stabilize the assembly.

The paddle assembly 20 which is positioned within tank 11 is supported by a plurality of supports 21A and 21B and 21C which depend from the horizontal braces 15. Suitably journaled within the depending supports 21 is an elongated shaft 22 which is preferably continuous through supports 21A, 21B and 21C. An elongated paddle member 24, preferably having an upwardly converging cross section similar to that indicated in FIG. 2, is supported from shaft 22 for rotation therewith by means of a series of paddle supporting arms 23.

The paddle drive assembly 30, comprises a conventional electric motor 31, a reduction drive 32 and an eccentric arm 33 adapted to be rotated by the motor through the reduction drive. A connecting rod or link 34 connects the drive arm 35 from shaft 22 to eccentric arm 33. The drive arm 35 is mounted, of course, non-rotatably with respect to shaft 22 in such a manner that as the eccentric arm 33 rotates, the paddle assembly 20 will oscillate between the positions indicated by the reference characters 24A and 24B in FIG. 2.

It is to be noted that the construction of paddle assembly 20 is such that an elongated space 25 exists between shaft 22 and paddle 24 such that the birds or other edible products being frozen are free to pass between the shaft and the paddle during oscillation thereof. This space is interrupted, of course, along the length of the paddle assembly by the presence of paddle supporting arms 23 but, nevertheless, does exist along a large percentage of the length of the paddle assembly.

Referring now additionally to FIG. 3, the circulating assembly 40 comprises a collection chamber 41 having a drain pipe (not shown) communicating with the upper extremity of the tank 11 as viewed in FIG. 1. Positioned within the collection chamber 41 are a pair of pumps 42A and 42B which, conveniently, may be driven by means of extension shafts from motors 44A and 44B, respectively. The pumps 42A and 42B force the heat-exchange fluid upwardly in lift pipes 43 and it flows into troughs 45A and 45B respectively. The coolant or other liquid so discharged flows via troughs 45A and 45B to the opposite extremity of the assembly and empties back into the tank through suitable discharge ports 46.

Some means must be provided, of course, for periodically filtering, changing and cooling or heating the heat-exchange fluid. If, for example, the particular process being executed is one of chilling poultry products, the fluid may be constantly re-cooled by shoveling ice into the wider portions of troughs 45A and 45B at the top of the apparatus shown in FIG. 1 near the pump outlets. The recirculation assembly 40 functions to constantly maintain the coolant or other liquid in the tank 11 flowing toward the upper end of the assembly as shown in FIG. 1. This flow, of course, causes the edible product introduced within the tank near its lower end (as shown in FIG. 1) to migrate along the tank until they reach the elevator assembly 50. The speed with which this migration takes place is controlled to a large extent by the rate at which the water or other heat-exchange liquid is recirculated through the apparatus. Thus, it is desirable to provide suitable controls for pump motors 44A and 44B such that the rate of pumping and, thus, the rate of recirculation can be adjusted for optimal heat-exchange performance in any particular operation.

The elevator assembly 50 comprises a conventional endless belt 52 mounted within the tank and exiting therefrom in a manner shown generally in FIG. 1. Preferably, belt 51 has a plurality of perpendicular slats 52 mounted thereon for assisting in the carrying of the edible products from the cooling tank. A suitable container or subsequent processing station may be disposed beneath the upper reach of conveyor assembly 50 into which the edible products drop after their cycle through the apparatus. Means must ordinarily be provided, additionally, for raising the conveyor assembly 50 such that it may be thoroughly cleaned in order to comply with state and federal food-processing regulations. Many such well-known configurations are available in the prior art and it is not deemed necessary to discuss them in detail.

In operation, the eviscerated poultry carcasses 60 or other products to be processed are introduced into the apparatus at or near the lower extremity thereof as viewed in FIG. 1. The operation of motor 31 causes paddle assembly 20 to oscillate back and forth as previously described in connection with FIG. 2 and the recirculation of the coolant or other heat-exchange liquid causes the poultry 60 to begin to migrate toward the opposite end of the machine. Proper adjustment of the speed of recirculating pumps 42A and 42B is effected, as noted previously, to control the speed of bird migration along the apparatus.

As the poultry carcasses 60 pass through tank 11, they are constantly agitated by the oscillating paddle member 24. The circular contour of the lower portion of tank 11 and the path of movement of the paddle correspond in such a manner that paddle 24 stays closely adjacent the bottom of the tank throughout its sweep and, thus, there is little, if any, possibility that a particular bird will be caught between the lower surface of the paddle and the edge of the tank.

As the paddle sweeps, the poultry are agitated to constantly expose their entire surface to "fresh" coolant and, thus, pockets of warm coolant are not allowed to collect. This, of course, rapidly accelerates the chilling process. As the paddle sweeps, there is no tendency for the birds to be swept out of the cooling fluids since they are free to pass between shaft 22 and the upper surface of paddle 24 into the opposite side of tank 11. This movement is assisted by the cross-sectional configuration of the paddle member 24, the lead side of the paddle always forming an obtuse angle with the base of the tank to assist the poultry in sliding thereover. This freedom of movement between sides of the tank avoids undesirable bruising of the poultry carcasses.

After the birds have been in the cooling tank the prescribed length of time and migrated to the extremity of the apparatus in which conveyor assembly 50 is running, they are lifted out onto the belt 51 by the slats 52, carried to the top of the machine and discharged into a suitable container. If necessary, two or more of the machines such as illustrated in FIG. 1 may be cascaded in such a manner that the products are carried from one tank via the conveyor assembly 50 directly into a second tank. This, of course, depends upon the temperatures desired to be achieved and, also, on the production capabilities of the remainder of the assembly line.

Thus, it will be seen that this invention has provided a novel agitation system for a cooling tank which is capable of effectively agitating the products introduced into the tank in such a manner that they will chill or heat rapidly and, yet, which will not tend to bruise or mutilate the products by its mechanical action.

While a preferred embodiment of this invention has been described in detail, it will be obvious to those skilled in the art that many other embodiments may be conceived without departing from the spirit of this specification and the accompanying drawings. Such other embodiments are to be deemed as included within the scope of the following claims unless these claims, by their language, expressly state otherwise.

I claim:

1. In an edible article chilling or heating apparatus having an elongated tank; means for circulating heat-exchange fluid within said tank; and an elongated paddle positioned in said tank, the improvement comprising:
    means for oscillating said paddle in said tank in a path conforming generally to a section of the lower cross-sectional contour thereof, the body of said paddle being of such height as to permit passage of the edible articles thereover during oscillation thereof without effecting the withdrawal from said fluid of the edible articles contacting said paddle.

2. The apparatus as set forth in claim 1 wherein said oscillating means comprises:
    an elongated shaft rotatably mounted within said tank and spaced from the bottom thereof, said elongated paddle depending from and being rotatable with said shaft, the body of said paddle being spaced from said shaft to allow said edible articles to pass therebetween as said paddle oscillates; and
    means for oscillating said shaft.

3. The apparatus as set forth in claim 1 wherein said circulating means comprises:
    an elongated trough communicating between opposite extremities of said tank, said trough emptying into said tank proximate one extremity thereof; and
    means for pumping said heat-exchange liquid from one extremity of said tank, into said trough wherethrough it flows to the opposite end of said tank and empties thereinto.

4. The apparatus as set forth in claim 3 which further comprises elevator means communicating with said tank at the extremity adjacent said pumping means for elevating said edible articles from said tank subsequent to their migration therethrough.

5. The apparatus as set forth in claim 1 wherein the path of oscillation of the lower edge of said paddle is adjacent the lower section of said tank.

6. The apparatus as set forth in claim 5 wherein the leading and trailing sides of said paddle converge in cross section such that the leading side forms an obtuse angle with respect to the approaching segment of the tank bottom.

7. The apparatus as set forth in claim 2 wherein the lower cross section of said tank is segmentedly circular and wherein said shaft is positioned at the center thereof.

References Cited

UNITED STATES PATENTS

| | | | |
|---|---|---|---|
| 54,597 | 5/1866 | Quick | 259—63 |
| 2,164,277 | 6/1939 | James | 259—101 X |
| 3,164,967 | 1/1965 | Marshall | 62—64 X |
| 3,240,026 | 3/1966 | Van Dolah et al. | 62—64 X |
| 3,335,788 | 8/1967 | Zebarth et al. | 165—109 X |

FOREIGN PATENTS 202,549  8/1923  Great Britain.

ROBERT A. O'LEARY, *Primary Examiner.*

A. W. DAVIS, *Assistant Examiner.*